(12) United States Patent
Birkby et al.

(10) Patent No.: US 9,133,744 B2
(45) Date of Patent: Sep. 15, 2015

(54) VEHICLE EXHAUST GAS TREATMENT APPARATUS

(75) Inventors: Nicholas Birkby, Lancashire (GB); Geoff Morgan, Lancashire (GB)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 815 days.

(21) Appl. No.: 13/180,743

(22) Filed: Jul. 12, 2011

(65) Prior Publication Data

US 2012/0014843 A1   Jan. 19, 2012

(30) Foreign Application Priority Data

Jul. 13, 2010 (GB) .................................. 1011763.8

(51) Int. Cl.
| | | |
|---|---|---|
| B01D 53/94 | (2006.01) | |
| F01N 3/035 | (2006.01) | |
| F01N 3/24 | (2006.01) | |
| F01N 3/10 | (2006.01) | |
| F01N 3/20 | (2006.01) | |
| F01N 3/28 | (2006.01) | |
| F01N 13/00 | (2010.01) | |

(52) U.S. Cl.
CPC ................ F01N 3/035 (2013.01); F01N 3/103 (2013.01); F01N 3/2066 (2013.01); F01N 3/28 (2013.01); F01N 13/0097 (2014.06); F01N 3/2892 (2013.01); F01N 2490/06 (2013.01); Y02T 10/24 (2013.01)

(58) Field of Classification Search
USPC ......... 422/168, 177, 178, 180, 211, 213, 217, 422/222, 223
See application file for complete search history.

(56) References Cited

U.S. PATENT DOCUMENTS

| | | | | |
|---|---|---|---|---|
| 4,709,549 A | * | 12/1987 | Lepperhoff | ..................... 60/295 |
| 6,212,885 B1 | * | 4/2001 | Hirota et al. | .................... 60/288 |
| 6,312,650 B1 | | 11/2001 | Frederiksen | |
| 7,229,597 B2 | * | 6/2007 | Patchett et al. | ............... 422/177 |
| 2003/0190269 A1 | * | 10/2003 | Liu et al. | ........................ 422/168 |
| 2003/0213234 A1 | * | 11/2003 | Funk et al. | ....................... 60/286 |
| 2008/0066451 A1 | | 3/2008 | Warner | |
| 2008/0245060 A1 | * | 10/2008 | Stieglbauer | ..................... 60/311 |
| 2010/0083643 A1 | * | 4/2010 | Hayashi et al. | ................. 60/297 |
| 2010/0329937 A1 | * | 12/2010 | Kato | .............................. 422/171 |
| 2011/0146252 A1 | * | 6/2011 | Silver et al. | ..................... 60/301 |

FOREIGN PATENT DOCUMENTS

| | | |
|---|---|---|
| EP | 0151558 | 8/1985 |
| EP | 1612382 | 1/2006 |

OTHER PUBLICATIONS

GB Search Report mailed Nov. 2, 2010.

* cited by examiner

*Primary Examiner* — Walter D Griffin
*Assistant Examiner* — Jelitza Perez
(74) *Attorney, Agent, or Firm* — Carlson, Gaskey & Olds, PC

(57) ABSTRACT

A vehicle exhaust gas treatment apparatus includes a DPF with SCR coating. An inlet piping fluidly communicates with the DPF and is positioned generally parallel to the DPF. An outlet pipe fluidly communicates with the DPF and is positioned generally parallel to the DPF. The apparatus is arranged such that exhaust gas flows through the inlet pipe in a first direction from a first inlet pipe end to a second inlet pipe end. The exhaust gas flows through the DPF in a second direction, generally parallel to and opposite to the first direction. The gas flows through the outlet pipe generally in the first direction from a first outlet pipe end to a second outlet pipe end.

32 Claims, 3 Drawing Sheets

VEHICLE EXHAUST GAS TREATMENT APPARATUS

RELATED APPLICATION

This application claims priority to GB Application 1011763.8, which was filed 13 Jul. 2010.

FIELD OF THE INVENTION

The present application relates to a vehicle exhaust gas treatment apparatus.

BACKGROUND

It is known to use treatment systems in order to reduce polluting vehicle emissions. Emission standards are set in many countries in order to limit the amount of pollutants released into the environment. At present, in order to fulfill the European and USA requirements, selective catalytic reduction and diesel particulate filters working in conjunction with one another are required. Both the selective catalytic reduction and diesel particulate filters take up valuable space in a vehicle.

Diesel particulate filters (DPFs) primarily filter soot, which can be burnt off the filter. However, they also filter ash from the emissions, dust from incoming air and fragments from the vehicle engine, which cannot be burnt off. It is therefore usually a requirement of a DPF in a commercial vehicle that it must have a removable cover so access for cleaning can be gained. In smaller, domestic vehicles, a DPF is designed to last the lifetime of the vehicle, so does not require a removable cover.

What is required is a method of treating exhaust emissions to the current standards that takes up a relatively small amount of space as possible in a vehicle. Access to filters may also be required.

SUMMARY

A vehicle exhaust gas treatment apparatus includes a diesel particulate filter with a selective catalytic reduction coating, an inlet pipe in fluid communication with the DPF and positioned generally parallel to the DPF, and an outlet pipe in fluid communication with the DPF and positioned generally parallel to the DPF. The apparatus is arranged such that exhaust gas flows through the inlet pipe in a first direction from a first inlet pipe end to a second inlet pipe end. The exhaust gas flows through the DPF in a second direction, which is generally parallel to and opposite to the first direction. The exhaust gas flows through the outlet pipe generally in the first direction from a first outlet pipe end to a second outlet pipe end.

The inlet pipe may be positioned on a first side of the DPF and the outlet pipe may be positioned on a second side of the DPF opposite the first side. Alternatively, the inlet pipe may be positioned on a first side of the DPF and the outlet pipe may be positioned on the first side of the DPF adjacent the inlet pipe. The inlet pipe may include an injector proximate the first inlet pipe end and remote from the second inlet pipe end. The inlet pipe may include a gas mixer proximate the first inlet pipe end and remote from the second inlet pipe end, where the mixer is downstream from the injector. The injector may be configured to inject fluid in the first direction.

The second inlet pipe end may be connected to an inlet of the DPF by a DPF inlet transition portion having a removable cover for gaining access to the DPF. The first outlet pipe end may be connected to an outlet of the DPF by a DPF outlet transition portion. The vehicle exhaust gas treatment apparatus may include a diesel oxidation catalyst (DOC) arranged such that the exhaust gas flows through the DOC in the first direction, and an axis of the DOC may be substantially in line with an axis of the DPF. The DOC may be connected to the first inlet pipe end by a DOC outlet transition portion. The DPF outlet transition portion may be positioned between the DPF and the DOC outlet transition portion.

BRIEF DESCRIPTION OF THE DRAWINGS

Embodiments of the present invention will now be described with reference to the accompanying drawings in which.

DETAILED DESCRIPTION

Figure 1:
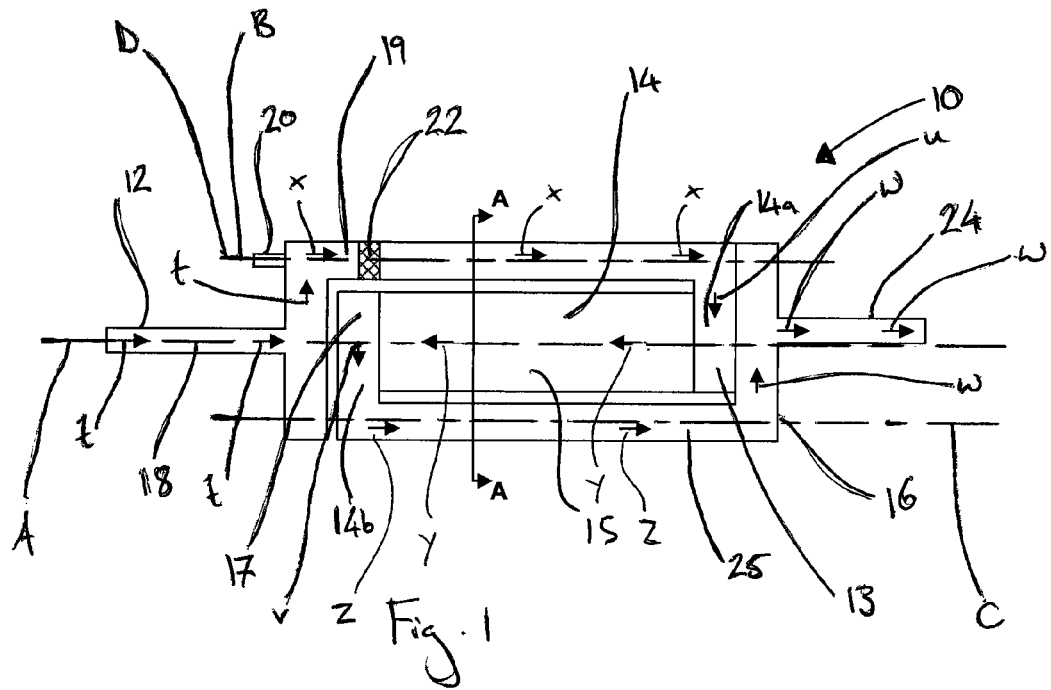
FIG. 1 is a schematic drawing showing flow of exhaust gases through a first embodiment of the present invention.
Figure 2:
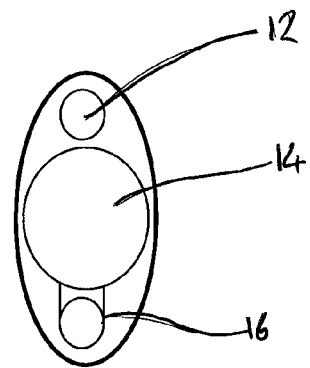
FIG. 2 is a cross-section A-A through the schematic of FIG. 1.

With reference to FIGS. 1 and 2, there is shown an exhaust gas treatment system 10 including an inlet portion 12, a filter section 14, and an outlet portion 16. The inlet portion 12 comprises an exhaust gas inlet 18 and an inlet pipe 19 having a longitudinal axis B. In this case inlet pipe 19 is a single inlet pipe. A urea injector 20 and a gas mixer 22 are mounted in the inlet pipe 19. The urea injector 20 is positioned between the exhaust gas inlet 18 and the gas mixer 22. The gas mixer 22 comprises a series of baffles arranged to create turbulence in gas passing through the mixer 22.

The filter section 14 comprises a diesel particulate filter 15 (DPF), an inlet transition portion 14a and an outlet transition portion 14b. The inlet transition portion 14a comprises a ducting section perpendicular to axis A connected at one end to the inlet pipe 19 and at the other to the DPF 15. The outlet transition portion 14b comprises a ducting section 17 connected at one end to the DPF 15 and at the other to the outlet portion 16. The DPF 15 has a longitudinal axis A and comprises a series of ceramic tubes in a honeycomb arrangement, half of which are closed at the inlet end and half of which are closed at the outlet end, thus forcing exhaust gases to pass through the side walls of at least one tube. The DPF 15 traps fine soot particles (amongst other pollutant particles). Once a predetermined level of trapped particles has been reached, the temperature within the DPF 15 is raised and the soot particles are burnt off. The tubes of the DPF 15 are coated with selective catalytic reduction (SCR) catalysts such as zeolite.

The outlet portion 16 comprises an exhaust gas outlet 24 connected to the outlet transition portion 14b by an outlet pipe 25, which has a longitudinal axis C. In this case the outlet pipe 25 is a single outlet pipe. The inlet and outlet portions 12, 16 are arranged around the filter section 14 such that the inlet pipe 19 is substantially on one side of the filter section 14 with inlet axis B being parallel to axis A and the outlet pipe 25 is substantially on the opposite side of the filter section 14, with outlet axis C being parallel to axis A. Gas flows through the inlet pipe 19 substantially in a first direction (as shown by arrows x), through the filter section 14 in a second direction (as shown by arrows y) parallel and opposite to the first direction, and through the outlet pipe 25 substantially in the first direction (as shown by arrows z).

Upon leaving the engine of a vehicle, exhaust gases flow through the gas inlet 18 (as shown by arrows t) into the inlet portion 12. Urea is added by the urea injector 20 in order to provide ammonia. Ammonia is required for the reduction of harmful oxides of nitrogen to nitrogen plus water.

The gas is then mixed in the gas mixer 22, creating turbulence in the exhaust gas. The turbulent gas then enters the SCR coated DPF 15 via the inlet transition portion 14a (as shown by arrow u), where the oxides of nitrogen are removed along with soot and other pollutant particles. The treated gas leaves the treatment system 10 via the outlet transition portion 14b (as shown by arrow v) and the gas outlet 24 (as shown by arrow w).

As will be appreciated, the major axis of the inlet pipe 19 is parallel to the major axis of the DPF which in turn is parallel to the major axis of the outlet pipe 25. As will also be appreciated, a major axis D of the urea injector 20 is parallel with the major axis B of the inlet pipe 19, in this case concentric with the major axis B of the inlet pipe 19. Whilst the urea injector 20 may tend to spray the urea in a "fan" direction, it will be appreciated that the primary axis of this fan is parallel to the major axis B of the inlet pipe 19 and concentric with the major axis D of the urea injector 20.

The arrangement of the inlet and outlet portions around the filter section and the changing flow directions provide maximized mixing volume in a minimized space, as well an optimized urea dosing position. Coating the DPF with an SCR covering provides a treatment system that takes up a relatively small space while providing efficient reduction of emissions.

Figure 3:
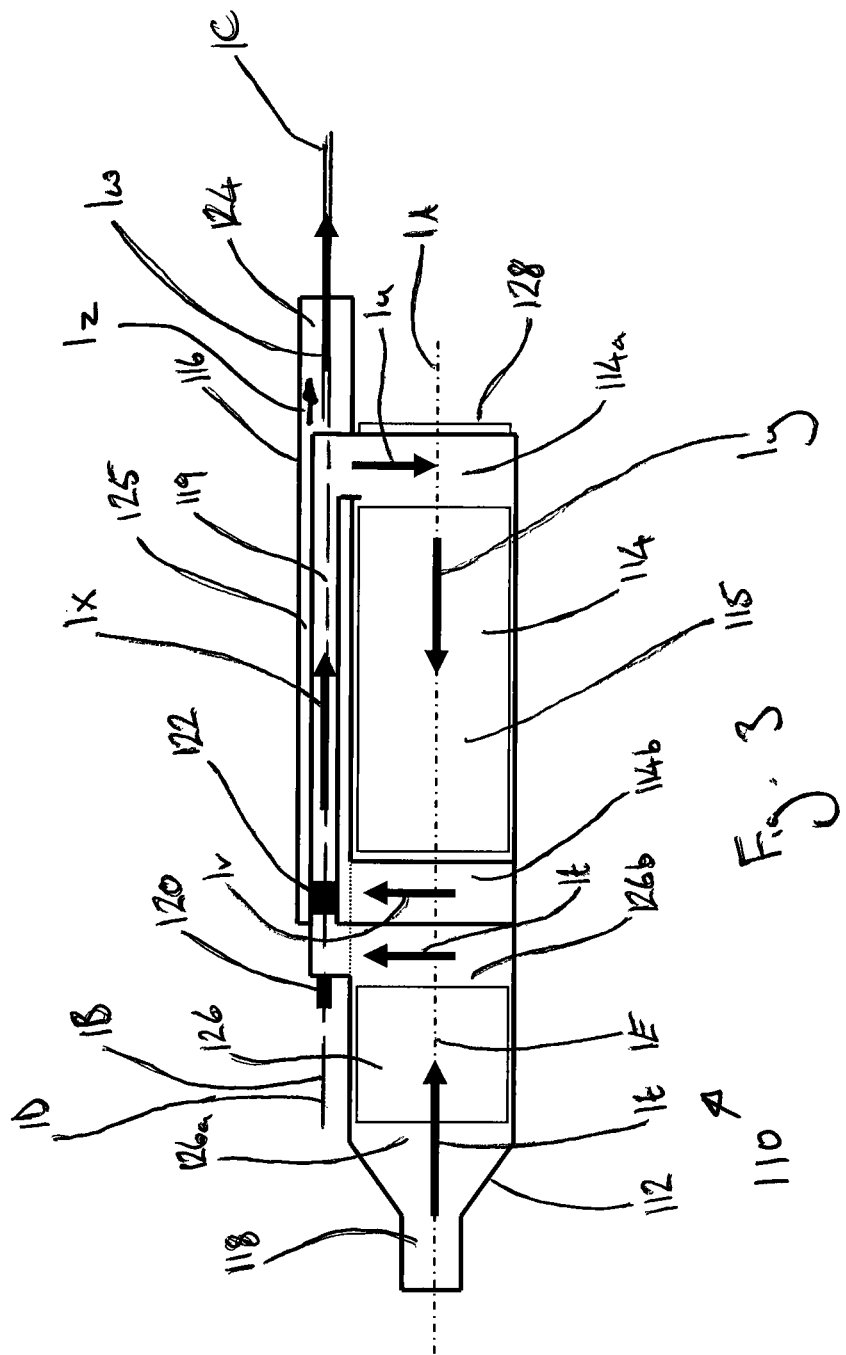
FIG. 3 is a schematic view of a second embodiment of the present invention.

A second embodiment of the present invention is shown in FIG. 3. Features which are substantially the same as those of the previous embodiment are given corresponding reference numbers with the additional prefix 1. The exhaust gas treatment system 110 comprises an inlet portion 112, a filter section 114 having a longitudinal axis 1A and an outlet portion 116. In contrast to the first embodiment, the inlet portion 112 here comprises an additional diesel oxidation catalyst (DOC) 126 positioned between the exhaust gas inlet 118 and the urea injector 120 and in line with the axis 1A. The DOC 126 has an inlet transition portion 126a and an outlet transition portion 126b. The DOC comprises, for example, palladium and platinum catalysts. In this embodiment the filter section 114 includes a removable filter hatch 128 positioned on the inlet portion 112 and providing access to the filter section 114. The filter hatch 128 can be used to gain access to the DPF 115 for cleaning in situ, or to remove the DPF 115 from the system for cleaning. In a further embodiment a filter hatch can be provided on the outlet portion to gain access to the DPF for cleaning in situ, or to allow removal of the DPF from the system for cleaning.

The inlet portion 112, filter section 114 and outlet portion 116 are arranged so that an inlet pipe 119, which connects the gas inlet 118, the DOC 126 and the gas mixer 120, is positioned adjacent an outlet pipe 125 that connects the gas outlet 124 to the filter section 114. Gas flows through the inlet pipe 119 substantially in a first direction (as shown by arrow 1x), through the filter section 114 in a second direction (as shown by arrow 1y) parallel and opposite to the first direction, and through the outlet pipe 125 substantially in the first direction (as shown by arrow 1z).

Exhaust gases enter the inlet portion 112 via the gas inlet 118 (as shown by arrows 10 on leaving the engine of a vehicle. In this embodiment the diesel oxidation catalyst breaks down some of the pollutants in the exhaust gases to less harmful components as described above. Once the exhaust gas has been passed through the DOC, urea is added by the urea injector 120 before turbulence is created by the mixer 122.

The turbulent gas is filtered through the SCR coated DPF before leaving the system via the exhaust gas outlet 124 (as shown by arrow 1w).

The removable filter hatch 128 provides access to the filter section 114 so that filters may be cleaned or changed to remove particles not burnt off during the rise in temperature. In further embodiments of the invention the gas mixer of either embodiment may not be required.

Figure 4:
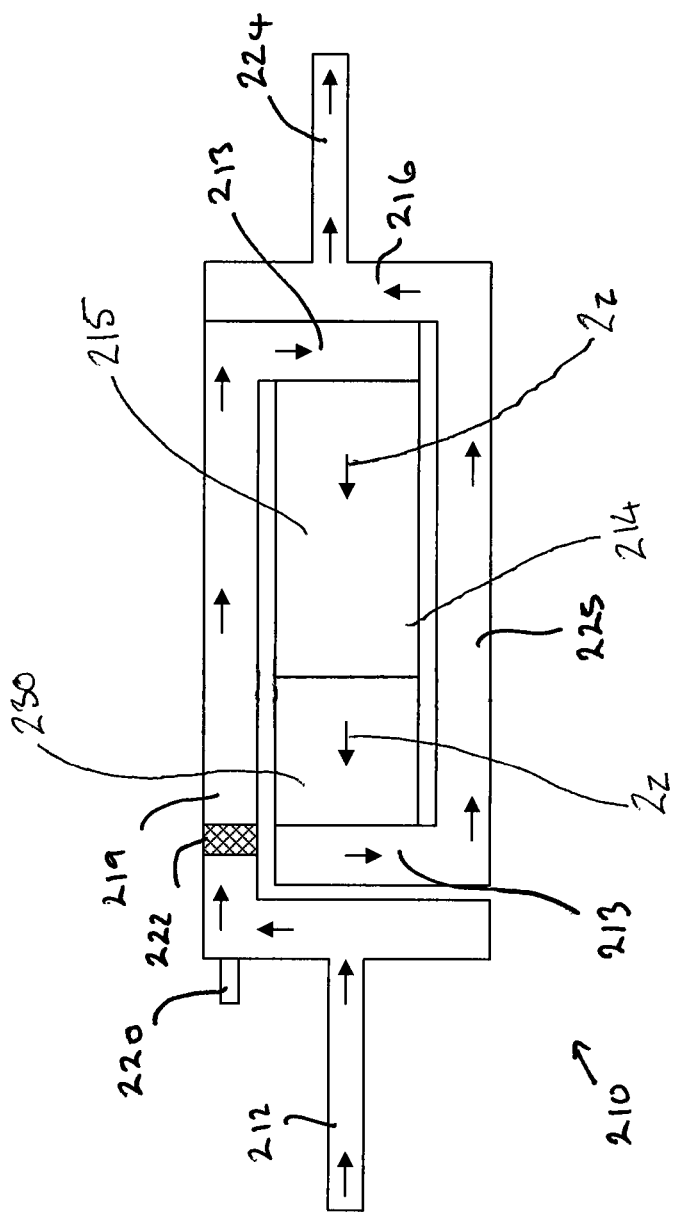
FIG. 4 is a schematic view of a third embodiment of the present invention.

A third embodiment of the present invention is shown in FIG. 4. Features which are substantially the same as those of the previous embodiment are given corresponding reference numbers with the additional prefix 2. The exhaust gas treatment system 210 comprises, in addition to the features of the first embodiment, a selective catalytic reduction (SCR) catalyst 230. In this embodiment the SCR catalyst 230 is positioned downstream of, and aligned with, the SCR coated DPF 215. Gas flows from the SCR coated DPF 215 through the SCR filter 230 (as shown by arrows 2z).

In a further embodiment an SCR catalyst can be positioned upstream of, and aligned with, an SCR coated DPF with the gas flowing through the SCR catalyst and then through the SCR coated DPF.

In particular where a vehicle exhaust gas treatment apparatus includes both an SCR coated DPF and an SCR catalyst, the exhaust gas may flow in the same direction through both the SCR catalyst and the SCR coated DPF.

Advantageously, a relatively short SCR coated DPF can be provided which is sufficient to filter the exhaust gas, and an additional length of SCR catalyst may be provided separately. The combined length of separate SCR catalyst and SCR coating within the DPF can provide sufficient catalyst for treating the oxides of nitrogen.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle exhaust gas treatment apparatus including:
   a diesel particulate filter (DPF) with a selective catalytic reduction (SCR) coating, the DPF defining a first longitudinal axis;
   an inlet pipe in fluid communication with the DPF and being positioned generally parallel to the DPF, the inlet pipe comprising a single inlet pipe defining a second longitudinal axis;
   an inlet configured to receive exhaust gases from an upstream exhaust component and direct the exhaust gases into the single inlet pipe via an inlet transition pipe portion fluidly connecting the inlet to the inlet pipe, wherein the inlet and inlet pipe are non-coaxial;
   an outlet pipe in fluid communication with the DPF and being positioned generally parallel to the DPF, the outlet pipe defining a third longitudinal axis, and wherein at least one of the second and third longitudinal axes is non-coaxial with the first longitudinal axis, and wherein exhaust gas flows through the inlet pipe in a first direction from a first inlet pipe end to a second inlet pipe end, flows through the DPF in a second direction, generally parallel to and opposite to the first direction, and then flows through the outlet pipe generally in the first direction from a first outlet pipe end to a second outlet pipe end; and
   an outlet configured to receive exhaust gas from the outlet pipe via an outlet transition pipe portion that is spaced from the inlet transition pipe portion, and wherein the inlet transition pipe portion and outlet transition pipe portion are arranged such that exhaust gas cannot flow directly from the inlet to the outlet without passing through the DPF.

2. The vehicle exhaust gas treatment apparatus as defined in claim 1 wherein the DPF is defined by a length that extends along the first longitudinal axis, and wherein the inlet pipe is positioned to extend along the length of the DPF on a first side of the DPF and the outlet pipe is positioned to extend along the length of the DPF on a second side of the DPF opposite to the first side.

3. The vehicle exhaust gas treatment apparatus as defined in claim 1 wherein the DPF is defined by a length that extends along the first longitudinal axis, and wherein the inlet pipe is positioned to extend along the length of the DPF on a first side of the DPF and the outlet pipe is positioned to extend along the length of the DPF on the first side of the DPF adjacent to the inlet pipe.

4. The vehicle exhaust gas treatment apparatus as defined in claim 1 in which the inlet pipe includes an injector proximate the first inlet pipe end and remote from the second inlet pipe end, the injector defining a fourth longitudinal axis that is non-coaxial with the first longitudinal axis.

5. The vehicle exhaust gas treatment apparatus as defined in claim 4 wherein the injector is configured to inject fluid in the first direction.

6. The vehicle exhaust gas treatment apparatus as defined in claim 4 in which the inlet pipe includes a gas mixer proximate the first inlet pipe end and remote from the second inlet pipe end, the mixer being downstream from the injector.

7. The vehicle exhaust gas treatment apparatus as defined in claim 1 wherein the second inlet pipe end is connected to an inlet of the DPF by a DPF inlet transition portion having an openable cover for gaining access to the DPF.

8. The vehicle exhaust gas treatment apparatus as defined in claim 1 wherein the first outlet pipe end is connected to an outlet of the DPF by a DPF outlet transition portion.

9. The vehicle exhaust gas treatment apparatus as defined in claim 8 wherein the DPF outlet transition portion comprises an openable cover for gaining access to the DPF.

10. The vehicle exhaust gas treatment apparatus as defined in claim 7 wherein the DPF is removable from the apparatus via an opening created by opening the openable cover.

11. The vehicle exhaust gas treatment apparatus as defined in claim 9 wherein the DPF is removable from the apparatus via an opening created by opening the openable cover.

12. The vehicle exhaust gas treatment apparatus as defined in claim 1 including a diesel oxidation catalyst (DOC) arranged such that the exhaust gas flows through the DOC in the first direction, exits the DOC and flows outwardly in a radial direction, and then enters the inlet pipe to flow in the first direction.

13. The vehicle exhaust gas treatment apparatus as defined in claim 12 wherein an axis of the DOC is substantially in line with the first longitudinal axis of the DPF.

14. The vehicle exhaust gas treatment apparatus as defined in claim 12 wherein the DOC is connected to the first inlet pipe end by a DOC outlet transition portion that defines the radial direction of flow.

15. The vehicle exhaust gas treatment apparatus as defined in claim 14 wherein an axis of the DOC is substantially in line with the longitudinal axis of the DPF in which the DPF outlet transition portion is positioned between the DPF and the DOC outlet transition portion.

16. The vehicle exhaust gas treatment apparatus as defined in claim 1 including an SCR catalyst in fluid communication with the DPF and positioned generally in line with the DPF.

17. The vehicle exhaust gas treatment apparatus as defined in claim 1 wherein the inlet pipe is radially spaced apart from the DPF such that the inlet pipe is external of the DPF.

18. The vehicle exhaust gas treatment apparatus as defined in claim 1 wherein both of the second and third longitudinal axes are non-coaxial with the first longitudinal axis.

19. The vehicle exhaust gas treatment apparatus as defined in claim 18 wherein the first, second, and third longitudinal axes are generally parallel to each other.

20. The vehicle exhaust gas treatment apparatus as defined in claim 19 wherein the second and third axes are positioned radially outwardly relative to the first longitudinal axis.

21. The vehicle exhaust gas treatment apparatus as defined in claim 19 wherein the second longitudinal axis is radially spaced apart from the first longitudinal axis in a first radial direction and the third longitudinal axis is radially spaced apart from the first longitudinal axis in a second radial direction opposite from the first radial direction.

22. The vehicle exhaust gas treatment apparatus as defined in claim 19 wherein the second and third longitudinal axes are closer to each other than to the first longitudinal axis.

23. The vehicle exhaust gas treatment apparatus as defined in claim 1 wherein the inlet is coaxial with the first longitudinal axis and wherein the inlet transition pipe portion extends transversely relative to the first and second longitudinal axes.

24. The vehicle exhaust gas treatment apparatus as defined in claim 1 wherein the outlet and outlet pipe are non-coaxial, and wherein the outlet transition pipe portion extends transversely relative to the first and third longitudinal axes.

25. The vehicle exhaust gas treatment apparatus as defined in claim 1 wherein the exhaust gas inters the inlet flowing in the first direction, is subsequently directed by the inlet transition pipe portion in a direction transverse to the first direction, and is then directed to flow in the first direction through the inlet pipe.

26. The vehicle exhaust gas treatment apparatus as defined in claim 1 wherein the single inlet pipe is only positioned on one side of the DPF such that all exhaust gas entering the inlet flows through the single inlet pipe and then into the DPF.

27. The vehicle exhaust gas treatment apparatus as defined in claim 26 wherein the outlet pipe comprises a single outlet pipe that is only positioned on one side of the DPF such that all exhaust gas exiting the DPF flows through the single outlet pipe and then out the outlet pipe.

28. The vehicle exhaust gas treatment apparatus as defined in claim 1 wherein the inlet transition pipe portion and outlet transition pipe portion are non-coaxial.

29. The vehicle exhaust gas treatment apparatus as defined in claim 1 wherein exhaust gas never flows directly from the inlet to the outlet without first passing through the DPF.

30. The vehicle exhaust gas treatment apparatus as defined in claim 1 wherein the inlet transition pipe portion and outlet transition pipe portion are only fluidly connected to each other via the DPF.

31. The vehicle exhaust gas treatment apparatus as defined in claim 1 wherein the inlet transition pipe portion and inlet are non-coaxial, and wherein the outlet transition pipe portion and outlet are non-coaxial.

32. The vehicle exhaust gas treatment apparatus as defined in claim 31 including a DPF inlet transition portion fluidly connecting the inlet pipe to the DPF and a DPF outlet transition portion fluidly connecting an outlet of the DPF to the outlet pipe, and wherein the DPF inlet transition portion is non-coaxial with the outlet transition pipe portion, and wherein the DPF outlet transition portion is non-coaxial with the inlet transition pipe portion.

* * * * *

UNITED STATES PATENT AND TRADEMARK OFFICE
CERTIFICATE OF CORRECTION

PATENT NO.        : 9,133,744 B2
APPLICATION NO.   : 13/180743
DATED             : September 15, 2015
INVENTOR(S)       : Nicholas Birkby et al.

Page 1 of 1

It is certified that error appears in the above-identified patent and that said Letters Patent is hereby corrected as shown below:

IN THE CLAIMS:

In claim 25, column 6, line 30; delete "inters" and insert --enters--

Signed and Sealed this
First Day of March, 2016

Michelle K. Lee
*Director of the United States Patent and Trademark Office*